United States Patent [19]

Henzler et al.

[11] Patent Number: 5,041,216
[45] Date of Patent: Aug. 20, 1991

[54] FLUIDIZED BED REACTOR FOR BIOLOGICAL PURIFICATION OF EFFLUENT

[75] Inventors: Hans-Jürgen Henzler, Solingen; Jörg Kauling; Jörg Edler, both of Cologne; Imre Pascik, Monheim, all of Fed. Rep. of Germany

[73] Assignee: Bayer Aktiengesellschaft, Leverkusen, Fed. Rep. of Germany

[21] Appl. No.: 392,507

[22] Filed: Aug. 11, 1989

[30] Foreign Application Priority Data

Sep. 2, 1988 [DE] Fed. Rep. of Germany ....... 3829873

[51] Int. Cl.$^5$ .............................................. C02F 3/08
[52] U.S. Cl. .................................. 210/151; 422/140; 422/147; 210/195.3; 210/199; 210/205
[58] Field of Search ............... 210/617, 618, 614, 150, 210/151, 195.3, 199, 205; 435/313; 422/139–142, 147

[56] References Cited

U.S. PATENT DOCUMENTS 4,182,675 1/1980 Jeris ..................................... 210/618
4,287,062 9/1981 von Nordenskjold .............. 210/199
4,391,703 7/1983 Crosby ................................. 210/151
4,415,451 11/1983 Suzuki ................................. 210/150
4,454,038 6/1984 Shimodaira et al. ................ 210/150
4,797,212 1/1989 von Nordenskjold .............. 210/614
4,833,083 5/1989 Saxena ................................. 210/617

FOREIGN PATENT DOCUMENTS 2841011 4/1980 Fed. Rep. of Germany ...... 210/151

Primary Examiner—Peter Hruskoci
Attorney, Agent, or Firm—Sprung Horn Kramer & Woods

[57] ABSTRACT

The fluidized bed reactor for biological treatment of effluent essentially comprises a container (1) over the base 2 of which elongated gassing units having gas exit apertures (5) are arranged parallel to one another, in such a way that in each case two neighboring circulating currents (8, 9) in mirror-image symmetry are produced in the reactor. In addition, the reactor (1) is supplied with a retention system (16) arranged on the outside for the separation of carrier particles for biocatalysts suspended in the effluent.

4 Claims, 1 Drawing Sheet

FIG.3 A-B

FLUIDIZED BED REACTOR FOR BIOLOGICAL PURIFICATION OF EFFLUENT

BACKGROUND OF THE INVENTION

The invention relates to a fluidised bed reactor for biological purification of effluent having carrier particles for biocatalysts, gassing units and having a retention system for the carrier particles.

In the purification of effluent, carrier particles for the microorganisms are used to an increasing extent in order to increase activity. Reactors used are fixed bed reactors and fluidised bed reactors. In fixed bed reactors, only a part of the reactor space is used due to uneven fouling which is adjusted naturally. In addition, constant process conditions (such as, for example pH value) are not maintained in the fixed bed. When concentration varies in the feed, the buffer effect of submersed biological life is not fully utilised due to lack of thorough mixing.

Well mixed fluidised bed reactors, in which the carriers for the microorganisms are suspended or are temporarily suspended, are therefore more suitable for the purification of effluent. Fluidisation is achieved by means of pumping liquid, by means of stirrers or by means of gassing the liquid. The disadvantage in pumping or stirring the liquid is that the effluent and the carrier particles can come into contact with the drive units. The carrier particles are thus subjected to intensive mechanical load which can lead in the long term to its destruction. To prevent this, additional screens must be installed to retain the solids.

In anaerobic purification of effluent, there is the further problem that the carrier particles have a tendency to float as a result of the floating effect of small bubbles of biogas which adhere to the solid. The solid layer which then forms on the surface of the liquid, as a rule, can no longer be recirculated by pumping or by the conventional stirring systems. On the other hand, when gassing the liquid, the microbubbles which adhere to the solid cause coalescence with the larger gas bubbles produced on gassing, so that floating of the solids can be avoided.

SUMMARY OF THE INVENTION

The object of the invention is to effect the movement of the carrier bodies for the biocatalysts in a fluidised bed reactor in the most favorable manner in terms of energy.

This object is achieved in accordance with the invention in a fluidised bed reactor by means of gassing units and a retention system for the carrier particles. In that pairs of elongated gassing units having gas outlet apertures are arranged parallel to one another over the base of the reactor, in such a way that in each case two neighbouring, circulating currents in mirror-image symmetry are produced.

A gassing unit preferably comprises a number of gas outlet apertures arranged close to one another, sinter bodies or injectors arranged in a line or band.

Futhermore, it has proved to be favorable if wedge-shaped inserts having a deflector plate are arranged between the gassing units.

A further development is that a control device is provided to supply the gassing units alternately with gas. The result of alternately supplying two gassing units is that there is partial gassing in the reactor which leads to sequential layering of the solid.

The retention system preferably comprises a sedimentation separator arranged outside of the reactor or built into the reactor, or comprises a bar screen.

Optimum current conditions are reached when the filling height of the fluidised bed reactor is approximately the same as the maximum dimension of a circulating current. This means that the ratio of filling height to length of the tank should be approximately 0.5. For the case when longer tanks have to be used for the sake of looking at a problem, it is advisable to operate using more than two circulating currents. Then, several (>2) gassing units, in each case two at a time, must be arranged one behind another in the longitudinal direction as a module in the fluidised bed reactor.

If gassing is continuous, at least two circulating currents form which cause the solid particles to be fluidised at lower gas rates than when using single unit surface gassing. The decisive criterion is where the gas is introduced. The most favorable solution in terms of energy results, surprisingly, when the gas is introduced near to the contact plane of the two neighbouring current regions. Compared to surface gassing, approximately 75% lower gas rates are required in this case for fluidisation.

Further improvement is possible by incorporating the above-mentioned current-inducing inserts between the gassing units. The gas rate could be reduced in this manner to only 5% of the gas rate required for surface gassing.

If only partial gassing of the tank takes place, intensive movement results in the gassed region, such that the solid is fluidised there, whereas only slight movement takes place in the non-gassed region, such that the greater part of the solid rests there. After a while it can be detected that solid is gradually transported from the zone of intensive movement to the zone of slight movement, and is deposited there. As a result of this, the solid content in the gassed half of the tank is reduced such that the solid remaining here can be moved at an even lower gas rate. This effect is particularly pronounced if the deposition and retention of the solid in the non-gassed half of the tank is assisted by deflector plates.

These facts give rise to a further possiblitiy for gassing which is efficient in terms of energy, and this is that only one gassing unit is supplied with gas and after a certain time gassing is switched to the other unit (alternating gassing). For alternating gassing, switch-over to the other gassing unit advantageously does not take place until the solid particles are completely fluidised in the gassed sections of the reactor. The switch-over time thus depends on the ratio of the gas capacity used and the solid mass to be moved.

An embodiment of the invention is explained in more detail below using drawings.

BRIEF DESCRIPTION OF THE DRAWINGS

FIG. 3 shows a section A-B according to FIG. 2 (gassing pipe).

DETAILED DESCRIPTION OF THE INVENTION

Figure 1:
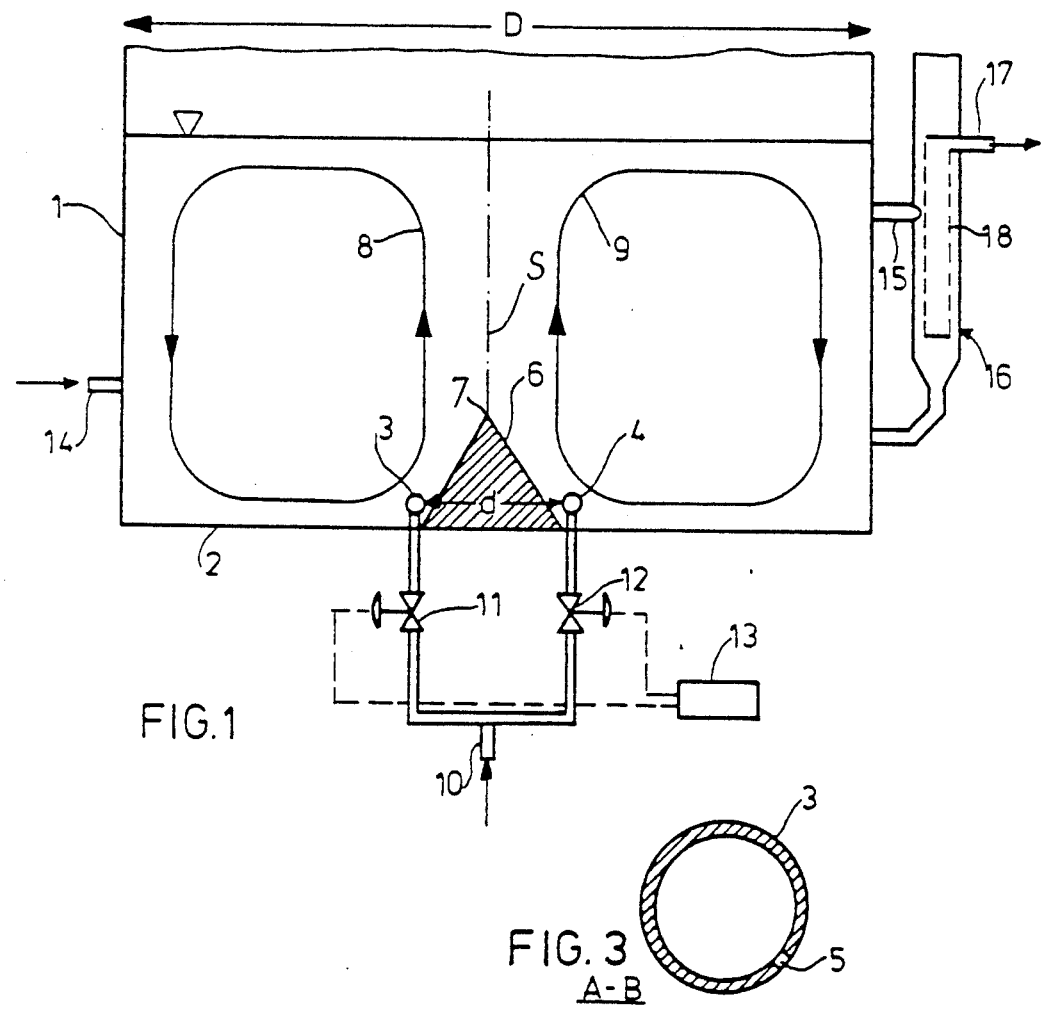
FIG. 1 shows a schematic side view of the fluidised bed reactor with circulating separator.
Figure 2:
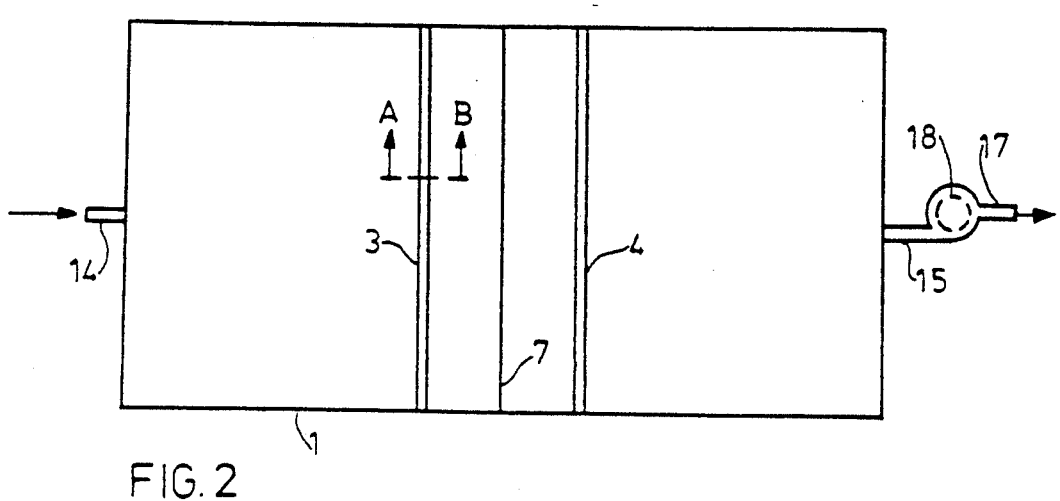
FIG. 2 shows a plan view of the reactor according to FIG. 1.

The reactor according to FIG. 1 comprises a guadrilateral container 1 having a side 11 m long and being 6 m high with a flat base 2. Two gassing units comprising gas distributors are arranged just above the base 2 of the container. The gas distributors comprise elongated straight pipes 3, 4 which are assembled at a distance of 230 cm from one another and 35 cm above the base 2. As shown in FIG. 3, the gas distributing pipes 3 and 4 are provided with bores 5 of diameter 3 mm, 5 cm apart. These bore 5 are the gas outlet apertures. A wedge 6 having a base of 200 cm and a height of 170 cm is situated between the pipes 3 and 4. The tip of the wedge 6 becomes a deflecting plate 7 which has a height of 130 cm.

The distance d between the gassing units is preferably 0.1 to 0.25 times the reactor length D.

The gassing units are arranged as mirror-images to the symmetrical plane S of the reactor. The gas bubbles emerging in the effluent from the gas distributing pipes 3 and 4, produce two neighboring circulating currents 8 and 9 showing mirror-image symmetry. The formation of these opposing circulating currents is promoted by the inserts 6 and 7.

The gas distributing pipes 3 and 4 are connected to the main gas pipe 10 and can be supplied with gas separately via the valves 11 and 12. For this purpose, the valves 11 and 12 are connected to a control unit 13 which in particular permits switching over of the gas supply between the gassing units and with the aid thereof, alternating gassing of the two halves of the reactor can be achieved.

In the reactor, there are 25 volume % of carbon-filled polyurethane foam particles which are covered with bacteria for purification of effluent. The average size of the particles is approximately 4 mm and their density when in water is 1040 kg/m$^3$. The carrier particles can be kept in motion by an amount of gas of only 320 m$^3$/h which corresponds to a gas rate in an empty pipe of 2 m/h and a specific gas capacity of 5.5 Watt/m$^3$.

When gassing is alternating, 80% of the solid is displaced from the gassed half of the tank to the non-gassed half at a cycle time of approximately 40 minutes, such that a rest time of 40 minutes at the most is estimated for approximately 80% of the solid. By increasing the gas rate to, for example 4 m/h, this rest time can be reduced to approximately 8 minutes. By a further increase to 6 m/h, fluidisation and displacement of the solid finally takes place in less than 1 minute. By changing the gas rate, the state of movement of the catalysts can be adapted to the particular requirements of an effluent purification plant.

The effluent stream which flows into the fluidised bed reactor 1 via the fitting 14, leaves the reactor via the outlet fitting 15 having the retention system 16 with outlet 17 connected to it. By way of example, a circulation separator having a built-in bar screen 18 can be used as the retention system. An intensive liquid current is produced at the bar screen 18 as a result of the tangential confluence 15 of the effluent stream, such that the required screen surface need only be approximately 0.5 m$^2$ at an effluent throughput of 125 m$^3$/h. Bar screens which are constructed such that the narrowest cross-section of the screen extends only over a small depth and the current channel widens following on from that, have proved to be particularly suitable for the retention of solid particles.

The gassing described is equally suitable for fluidised bed reactors operating aerobically and anaerobically. For aerobic operation, air or an oxygen-air mixture is fed into the main gas pipe. On the other hand, for anaerobic operation, biogas is fed to the main gas pipe 10, the biogas being produced in the reactor 1 in an anaerobic biological degradation.

The advantages of the invention are:

a) the saving of stirring devices to fluidise the effluent having carrier particles suspended therein, b) optimised fluidisation with regard to energy and thorough mixing in the reactor, c) careful treatment of the carrier particles and biomass adhered thereto, in the sense of minimising abrasion and mechanical removal, and d) the avoidance of floating carriers.

We claim:

1. In a fluidised bed reactor for biological purification of effluent using carrier particles for biocatalyst, having a base, gassing units, effluent inlet and outlet, and a retention system for the carrier particles, the improvement wherein the gassing units are elongated gas distribution pipes (3, 4) and have gas outlet apertures (5) arranged parallel to one another over a central portion of the reactor base (2) to define pairs of apertures, a wedge shaped insert (6) having a deflector plate (7) arranged between the gassing units, wherein the distance between the gassing unit is 0.1 to 0.25 times the length of said reactor, and wherein said pipes and said insert are constructed and arranged for producing, two neigboring, effluent circulation currents (8, 9) in mirror-image symmetry upflowing at a central portion of the reactor and downflowing at walls of the reactor central portion of the reactor and downflowing at walls of the reactor.

2. The fluidised bed reactor according to claim 1, wherein each gassing unit comprises a number of gas outlet apertures (5) arranged close to one another, sinter bodies or injectors arranged in a line or band.

3. The fluidised bed reactor according to claim 1, further comprising a control device (13) to alternately supply the gassing units with gas.

4. The fluidised bed reactor according to claim 1, wherein the retention system comprises a sedimentation separator or bar screen (18).

* * * * *